US007385495B2

(12) United States Patent
Buhr et al.

(10) Patent No.: US 7,385,495 B2

(45) Date of Patent: Jun. 10, 2008

(54) ILLUMINATION DEVICE FOR VEHICLES AND METHOD FOR CONTROLLING AN ILLUMINATION DEVICE FOR VEHICLES

(75) Inventors: Christoph Buhr, Leiferde (DE); Anja Böttcher, Hattorf (DE)

(73) Assignee: Volkswagen AG, Wolfsburg (DE)

( * ) Notice: Subject to any disclaimer, the term of this patent is extended or adjusted under 35 U.S.C. 154(b) by 217 days.

(21) Appl. No.: 11/251,998

(22) Filed: Oct. 17, 2005

(65) Prior Publication Data

US 2006/0083011 A1 Apr. 20, 2006

(30) Foreign Application Priority Data

Oct. 18, 2004 (DE) ...................... 10 2004 050 655

(51) Int. Cl.

*B60Q 1/26* (2006.01)

*G08B 23/00* (2006.01)

(52) U.S. Cl. ................. 340/469; 340/815.45; 340/321; 340/691.1; 362/800

(58) Field of Classification Search ................ 340/469, 340/815.45

See application file for complete search history.

(56) References Cited

U.S. PATENT DOCUMENTS

| | | | |
|---|---|---|---|
| 3,972,626 A | 8/1976 | Laskowsi | 356/226 |
| 6,111,367 A | 8/2000 | Asano et al. | 315/291 |
| 6,329,764 B1 | 12/2001 | van de Ven | 351/291 |

(Continued)

FOREIGN PATENT DOCUMENTS

| | | |
|---|---|---|
| DE | 40 21 131 | 1/1992 |

(Continued)

OTHER PUBLICATIONS

German Search Report for German Patent Application No. 01 2004 050 655.8, Nov. 10, 2006.

(Continued)

*Primary Examiner*—Donnie L. Crosland

(74) *Attorney, Agent, or Firm*—Kusner & Jaffe

(57) ABSTRACT

The present invention relates to an illumination device for vehicles with at least light-emitting diode (3) and a light control unit (1), wherein the light control unit (1) is connected to the at least one light-emitting diode (3) and a pulse-width modulated clock signal (PWM) can be generated and transmitted to the at least one light-emitting diode (3) with the light control unit (1). The illumination device for vehicles according to the invention comprises a circuit (2) arranged between the light control unit (1) and the at least one light-emitting diode (3), with which, depending on the control signal (S), the pulse-width modulated clock signal (PWM) can be fed via different resistors (R1, R2, R3) to the at least one light-emitting diode (3). The present invention further relates to a method for controlling an illumination device for vehicles with at least one light-emitting diode (3) and a light control unit (1). In the method according to the invention the light control unit (1) generates a pulse-width modulated clock signal (PWM), which the light control unit (1) transmits to a circuit (2). The circuit receives a control signal (S) and, depending on the control signal (S), feeds the pulse-width modulated clock signal to the at least one light-emitting diode (3) via different resistors (R1, R2, R3).

13 Claims, 2 Drawing Sheets

U.S. PATENT DOCUMENTS

| | | | | |
|---|---|---|---|---|
| 6,400,101 | B1 | 6/2002 | Biebl et al. | 315/291 |
| 6,414,437 | B1 | 7/2002 | Diez et al. | 315/77 |
| 6,486,617 | B2 | 11/2002 | Pilz et al. | 315/291 |
| 6,515,434 | B1 | 2/2003 | Biebl | 315/291 |
| 6,628,249 | B1 | 9/2003 | Kamikawa et al. | 345/441 |
| 6,747,420 | B2 | 6/2004 | Barth et al. | 315/291 |
| 6,864,641 | B2 | 3/2005 | Dygert | 315/216 |
| 6,975,214 | B2 | 12/2005 | Schleicher | 340/435 |
| 7,049,769 | B2 | 5/2006 | Boulouednine et al. | 315/324 |
| 2002/0191416 | A1 | 12/2002 | Wesson | 362/555 |
| 2003/0011625 | A1 | 1/2003 | Kellis | 345/690 |
| 2004/0179368 | A1 | 9/2004 | Takeda et al. | 362/466 |

FOREIGN PATENT DOCUMENTS

| | | |
|---|---|---|
| DE | 197 48 007 | 5/1999 |
| DE | 199 01 735 | 7/1999 |
| DE | 199 30 174 | 1/2001 |
| DE | 199 45 546 | 4/2001 |
| DE | 199 50 135 | 4/2001 |
| DE | 100 11 306 | 9/2001 |
| DE | 100 13 215 | 9/2001 |
| DE | 100 13 216 | 9/2001 |
| DE | 100 27 478 | 12/2001 |
| DE | 101 12 114 | 10/2002 |
| DE | 102004008896 | 9/2004 |
| DE | 102004012185 | 9/2004 |
| EP | 1 278 401 | 1/2003 |
| EP | 1 280 384 | 1/2003 |
| EP | 1 445 989 | 3/2006 |
| EP | 1 379 108 | 9/2006 |
| JP | 55 045 235 | 3/1980 |
| JP | 08 069 886 | 3/1996 |
| WO | WO 97/50168 | 12/1997 |
| WO | WO 99/20085 | 4/1999 |

OTHER PUBLICATIONS

European Search Report for European Patent Application No. EP 05022530.9, Dec. 6, 2005.

ILLUMINATION DEVICE FOR VEHICLES AND METHOD FOR CONTROLLING AN ILLUMINATION DEVICE FOR VEHICLES

BACKGROUND OF THE INVENTION

1. Field of the Invention

The present invention relates to an illumination device for vehicles with at least one light-emitting diode and one light control unit, wherein the light control unit is connected to the at least one light-emitting diode and a pulse-width modulated clock signal can be generated and transmitted to the at least one light-emitting diode with the light control unit. Further, the invention relates to a method for controlling an illumination device for vehicles with at least one light-emitting diode and one light control unit.

2. Description of the Related Art

Light-emitting diodes are being used increasingly as light sources in vehicle lights. In particular, the light-emitting diode is becoming increasingly significant in the area of the exterior illumination of motor vehicles. These light sources have the advantage over conventional incandescent bulbs that they exhibit a longer lifetime and increased productive efficiency.

The light-emitting diodes are, for example, arranged in an array or several arrays. This way they can perform different illumination functions. There are illumination functions that differ with respect to brightness, i.e. the illumination functions differ with respect to the light flux emitted in the respective illumination functions. This way the same light-emitting diode or same light-emitting diode array can perform two or more illumination functions by emitting a different light flux in the different illumination functions.

Light-emitting diodes are conventionally controlled by way of a pulse-width modulated clock signal. The light flux, i.e. the brightness of the light-emitting diode is modified by way of the duty cycle of the clock signal, i.e. the ratio of the active to the passive phase is modified.

An illumination device for motor vehicles that exhibits as its light source light-emitting diodes, the brightness of which is adjustable, is known from DE 100 27 478 A1. The adjustment of the brightness is effected by modifying the duty cycle (pulse/pause ratio). A method for controlling illumination means in vehicles as well as a device for conducting a method in which the brightness of the light-emitting diodes is controlled by the pulse/pause ratio are also known from DE 199 45 546 A1.

A disadvantage of conventional controls of light-emitting diodes by means of the duty cycle of the pulse-width modulated clock signal is that the resolution of the modification in brightness, in particular at low levels of brightness, is too low. The duty cycle of the clock signal can usually be modified by 1% to 100% with a step size of at least 1%. Should the light-emitting diode not only perform two different illumination functions at different levels of brightness, but modify the brightness of one or several of the respective illumination functions with a very fine resolution, then the step sizes of known control devices are inadequate for light-emitting diodes.

SUMMARY OF THE INVENTION

It is thus the object of the present invention to provide an illumination device for vehicles and/or a method for controlling an illumination device for vehicles of the aforementioned type, which can produce very small modifications in the brightness of the light-emitting diode over a large brightness range, or at least in a part of that range.

This object is realized with the features of an illumination device for vehicles claimed below and/or with the features of a method for controlling an illumination device for vehicles, as claimed below. Advantageous embodiments and refinements result from the features of the invention defined by the subclaims.

The illumination device for vehicles according to the invention comprises a circuit arranged between the light control unit and the at least one light-emitting diode, with which, depending on a control signal, the pulse-width modulated clock signal can be fed via different resistors to the at least one light-emitting diode. An advantage of the illumination device according to the invention is that any brightness characteristics can be attained for the light-emitting diode through the selection of different resistor values, and thus different resolutions can be set for different brightness ranges. Thus, different gradients of the corresponding characteristic can be set. This has the advantage that, for example, a very fine resolution, i.e. a small characteristic gradient, is possible with low brightness values, and a coarser resolution can be selected for higher levels of brightness so that the entire controllable range of brightness can remain relatively large in comparison with conventional controls.

According to a preferred embodiment of the illumination device for vehicles according to the invention the control signal determines the brightness range of the at least one light-emitting diode.

According to a further preferred embodiment, different resistors that are associated with different brightness ranges are provided in the circuit. Respectively associated with these resistors are, in turn, switches that can be switched by means of relays or power electronics. The switches are arranged in such a way that the pulse-width modulated clock signal can be fed to the at least one light-emitting diode via the resistor associated with the switch in question when the switch is closed. The entire brightness characteristic of the at least one light-emitting diode generated by the resistor circuit approaches a (logarithm or) exponential function according to a preferred embodiment of the illumination device for vehicles according to the present invention. This embodiment has the advantage that modifications of brightness can be better adjusted to the perception of the human eye. The sensitivity of the human eye is namely not linear, but rather almost logarithmic.

According to a preferred embodiment of the illumination device for vehicles the circuit is arranged in such a way that a clock signal with a lower duty cycle is fed to the at least one light-emitting diode via a larger resistor, and a clock signal with a higher duty cycle is fed to the at least one light-emitting diode via a smaller resistor. By this means it is attained that the brightness characteristic of the light-emitting diode is flatter at lower levels of brightness so that the resolution in this range is finer than at higher levels of brightness, even if the duty cycle of the pulse-width modulated clock signal in the light control unit can only be modified with a fixed step size over the entire range. A courser resolution is thus accepted at higher levels of brightness. A light control unit that can modify the duty cycle of the pulse-width modulated clock signal in a linear fashion with a fixed step size can thus be used advantageously in the illumination device for vehicles according to the present invention. Thus, a conventional light control unit can be used in the illumination device for vehicles according to the present invention, thereby saving costs. It is namely merely necessary to provide a circuit between the light control unit and the light-emitting diode.

As a result of the PWM light control unit's particular ability to conduct a limited number of possible PWM levels via one of the respective several different resistors, the connected lights exhibit altogether considerably more possible gradations of brightness. Based on the combination of the original number of "PWM levels" and the selection of one of the resistors for each level, the light control unit has numerous "dimming levels" at its disposal. This enables, on the one hand, a very large range of adjustment from completely dark to completely bright, whereas, on the other hand, the smallest possible differences in brightness between the "levels" is sufficiently small so as not to be perceived as a disturbing jump in brightness when dimming the lights from one level to the next.

In the method for controlling an illumination device for vehicles according to the invention, the light control unit generates a pulse-width modulated clock signal and transmits said clock signal to a circuit. The circuit receives a control signal and, depending on the control signal, feeds the pulse-width modulated clock signal to the at least one light-emitting diode via different resistors. This way, the brightness resolution can be adjusted to any brightness range depending on the control signal, while a conventional pulse-width modulated clock signal, whose duty cycle is modifiable with a given fixed step size, can still be used.

According to a preferred embodiment of the method, a desired level of brightness is transmitted to the light control unit, which generates the duty cycle of the pulse-width modulated clock signal depending on the desired level of brightness. Further, the control signal preferably indicates the brightness range in which the desired brightness of the at least one light-emitting diode lies. In this case, a resistor provided in the circuit corresponds to each brightness range, while the values of the resistors differ. Thus, the duty cycle of the pulse-width modulated clock signal can be modified linearly with a fixed step size, while the duty cycle is set depending on the desired brightness. The control signal determines the resistor path via which the clock signal is fed to the light-emitting diode so that the brightness characteristic, i.e. in particular the modification of brightness between the fixed predetermined step sizes, can be set in any way via the resistors.

According to a further embodiment of the method according to the present invention, a clock signal with a lower duty cycle is fed to the at least one light-emitting diode via a larger resistor, and a clock signal with a higher duty cycle is fed to the at least one light-emitting diode via a smaller resistor. In cases of lesser brightness this results in a flatter brightness characteristic of the light-emitting diode so that a finer resolution is possible in this brightness range.

According to a preferred refinement of the method according to the present invention, the desired brightness depends on the surrounding conditions of the motor vehicle. This way, the visibility of the rearward light signals on the vehicle can be improved, as it leads to different levels of brightness, for example, by day and by night.

The illumination device can be, for example, interior illumination units or exterior illumination units of a motor vehicle. These can be headlights, direction indicator lights, tail and brake lights at the rear of the vehicle, reversing lights, day lights, fog lights, side turn signals or adaptive illumination functions of the vehicle.

The invention will now be illustrated by means of an embodiment with reference to the drawings.

DESCRIPTION OF THE PREFERRED EMBODIMENTS

Figure 1:
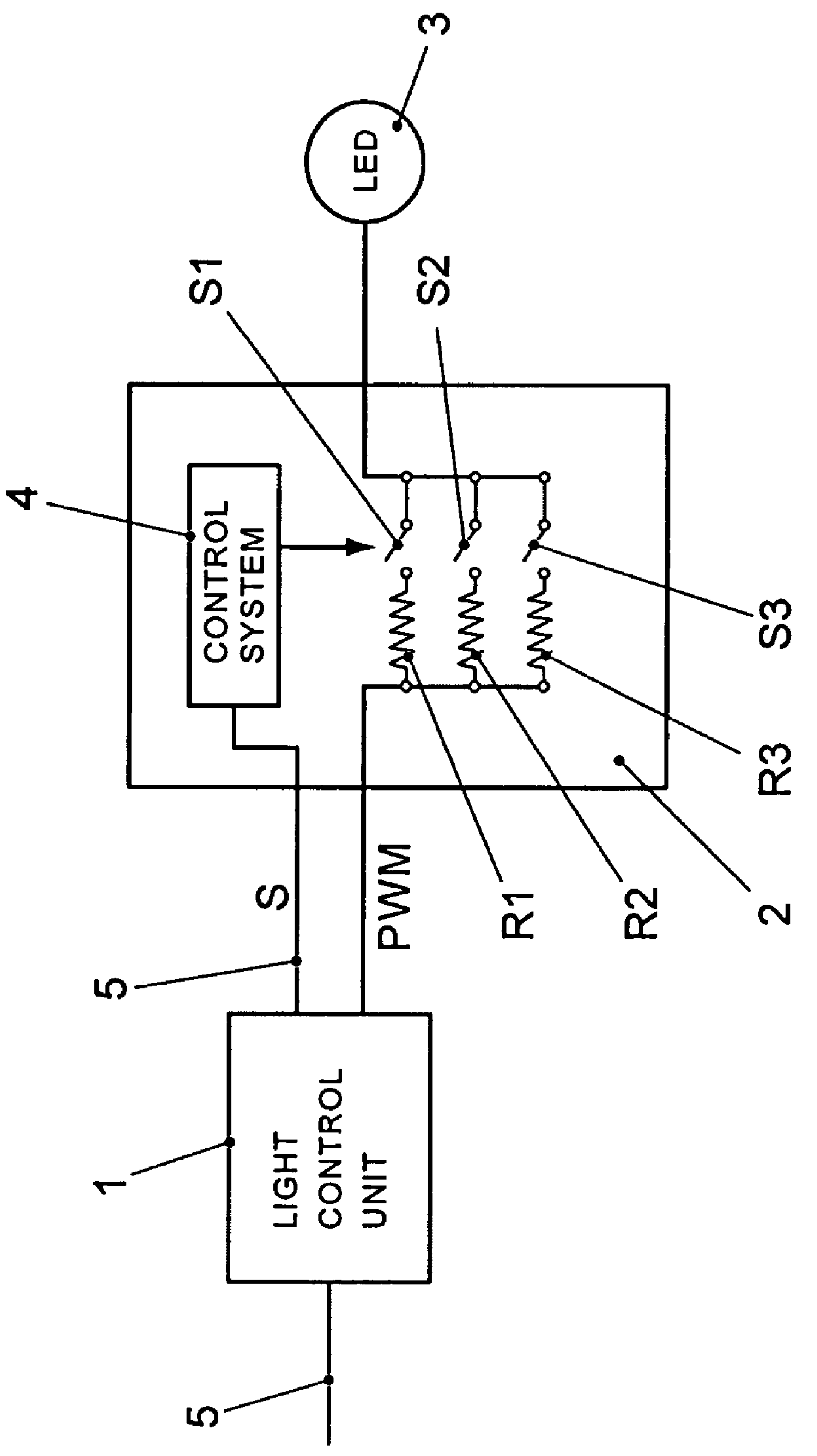
FIG. 1 shows a schematic representation of an embodiment of the illumination device for vehicles according to the present invention and FIG. 2 shows the brightness characteristic of the light-emitting diode of the illumination device according to the embodiment shown in FIG. 1.
Figure 2:
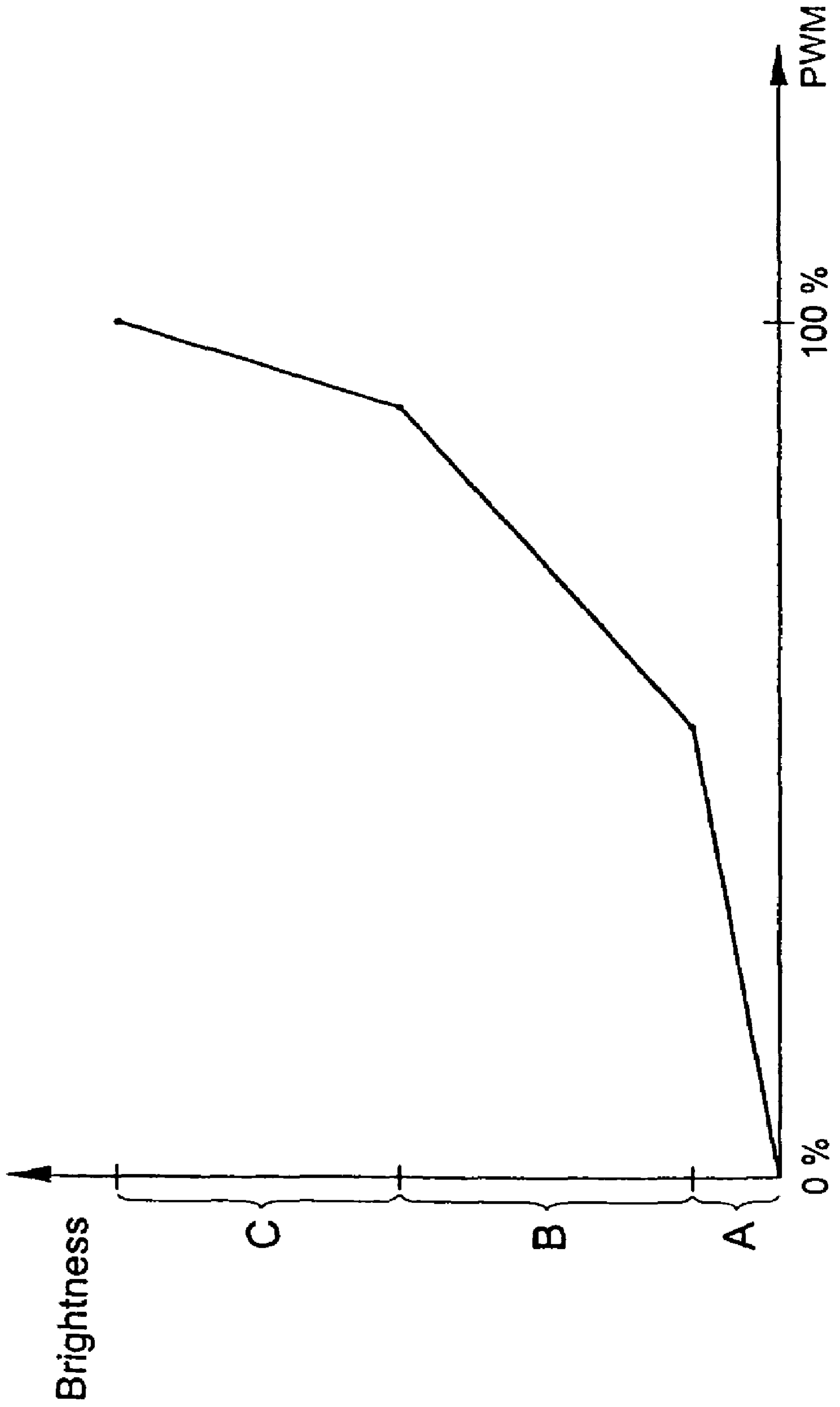

The illumination device comprises a light-emitting diode 3 or an array with a plurality of light-emitting diodes. The light-emitting diode 3 is controlled via a known light control unit 1. This light control unit 1 receives a value for the desired brightness via a vehicle bus 5. Based on this value, the light control unit 1 generates a pulse-width modulated clock signal, whose duty cycle corresponds with the value of the desired brightness. During this process the light control unit 1 can take into account the brightness characteristic, shown in FIG. 2, of the illumination device. The pulse-width modulated clock signal PWM is transmitted to the circuit 2. Further, a control signal S is transmitted to the circuit 2. In the illustrated embodiment the control signal S is also transmitted by the light control unit 1.

In the circuit 2, different protective resistors R1, R2 and R3 are provided in parallel for the light-emitting diode 3. Associated with each of the protective resistors R1, R2 and R3 is a switch S1, S2 and S3. Each of these switches S1, S2 or S3 can be switched by a control system 4. The resistors R1, R2 and R3 are connected via their respective switches S1, S2 and S3 to both the light-emitting diode and the inlet of the circuit 2 for the clock signal from the dimming unit 1. Thus, if, for example, the switch S1 is closed by the control system 4, the clock signal of the light-emitting diode 3 is fed via the resistor R1. If, on the other hand, the switch S2 is closed, the clock signal is fed via the resistor R2, and correspondingly, if S3 is closed, via the resistor R3 to the light-emitting diode 3.

The control system 4 is a microcontroller with an interface for the bus 5, via which the control signal S is fed. In the control system 4 relays or power electronics, for example power semiconductors, which form the switches S1, S2 and S3, are further provided. The brightness ranges A, B and C (cf. FIG. 2) are respectively associated with the resistors R1, R2 and R3. If the control signal S represents the desired brightness value, the control system 4 ascertains in which of the brightness ranges A, B or C the desired brightness value lies. If the desired brightness value is in range A, the control system 4 closes the switch S1; if the desired brightness value is in brightness range B, the control system closes the switch S2; and if the desired brightness value is in the brightness range C, the control system 4 closes the switch S3. This way, the brightness characteristic shown in FIG. 2 can be produced.

If not only three resistors but a larger number of resistors are used in the circuit 2, then the characteristic can approach an exponential function that takes into account the logarithmic sensitivity of the human eye. It is a distinguishing feature of the characteristic shown in FIG. 2 that the brightness of the light-emitting diode 3 can be modified in much smaller steps in brightness range A than in brightness range B or C. The duty cycle of the pulse-width modulated clock signal PWM generated by the known light control unit 1 can namely be changed only linearly with a fixed step size of, for example, 1%. In the characteristic generated by the illumination device for vehicles according to the present invention, many more steps are available for a given brightness modification in brightness range A than in brightness ranges B and C. On the other hand, the brightness range that is altogether available is adequately large, since only coarser resolutions are selected for higher levels of brightness. Such a characteristic is advantageous in particular for the rearward light signals of a motor vehicle.

LIST OF REFERENCES

1 Light control unit
2 Circuit
3 Light-emitting diode
4 Control System
5 Vehicle bus
S Control signal
PWM Pulse-width modulated clock signal
R1, R2, R3 Resistors with different values
S1, S2, S3 Switches

The invention claimed is:

1. Illumination device for vehicles comprising at least one light-emitting diode (3) and a light control unit (I), wherein the light control unit (1) is connected to the at least one light-emitting diode (3) and a pulse-width modulated clock signal (PWM) is generated with the light control unit (1) and transmitted to the at least one light-emitting diode (3); a circuit (2) arranged between the light control unit (1) and the at least one light-emitting diode (3), with which, depending on a control signal (S) received by the circuit (2), the pulse-width modulated clock signal (PWM) is fed via different resistors (R1, R2, R3) to the at least one light-emitting diode (3).

2. Illumination device for vehicles according to claim 1, wherein the control signal (S) determines the brightness range of the at least one light-emitting diode (3).

3. Illumination device for vehicles according to claim 2, wherein different resistors (R1, R2, R3) are provided in the circuit (2), wherein the resistors (R1, R2, R3) are associated with different brightness ranges (A, B, C) and wherein each resistor (R1, R2, R3) is associated with a switch (S1, S2, S3) that is switchable by means of relays or power electronics, and wherein the switches (S1, S2, S3) are arranged in such a way that the pulse-width modulated clock signal (PWM) is fed to the at least one light-emitting diode (3) via the resistor associated with the switch in question when the switch is closed.

4. Illumination device for vehicles according to claim 1, wherein the brightness characteristic of the at least one light-emitting diode (3) generated by the resistor circuit approaches an exponential function.

5. Illumination device for vehicles according to claim 1, wherein the circuit (2) is set up in such a way that a clock signal with a lower duty cycle is fed to the at least one light-emitting diode (3) via a larger resistor, and a clock signal with a higher duty cycle is fed to the at least one light-emitting diode via a smaller resistor.

6. Illumination device for vehicles according to claim 1, wherein the circuit (2) is connected to a vehicle bus (5) via which the control signal (S) can be transmitted.

7. Illumination device for vehicles according to claim 5, wherein the light control unit (1) modifies the duty cycle of the pulse-width modulated clock signal (PWM) linearly with a fixed step size.

8. Method for controlling an illumination device for vehicles with at least one light-emitting diode (3) and a light control unit (1), wherein the light control unit (1) generates a pulse-width modulated clock signal (PWM), which the light control unit (1) transmits to a circuit (2), and the circuit (2) receives a control signal (S) and, depending on the control signal (S), feeds the pulse-width modulated clock signal (PWM) to the at least one light-emitting diode (3) via different resistors (R1, R2, R3).

9. Method according to claim 8, wherein a desired brightness is transmitted to the light control unit (1), and the light control unit (1), depending on the desired brightness, generates the duty cycle of the pulse-width modulated clock signal (PWM) and the control signal (S).

10. Method according to claim 8, wherein the control signal (S) indicates in which brightness range (A, B, C) the desired brightness of the at least one diode lies, and wherein each resistor (R1, R2, R3) provided in the circuit (2) corresponds to a brightness range (A, B, C), while the values of the resistors (R1, R2, R3) differ.

11. Method according to claim 9, wherein the light control unit (1) modifies the duty cycle of the pulse-width modulated clock signal (PWM) linearly with a fixed step size.

12. Method according to claim 9, wherein a clock signal with a lower duty cycle is fed to the at least one light-emitting diode (3) via a larger resistor, and a clock signal with a higher duty cycle is fed to the at least one light-emitting diode (3) via a smaller resistor.

13. Method according to claim 8, wherein the desired brightness depends on the surrounding conditions of the vehicle.

* * * * *